US007543756B2

(12) United States Patent
McDonnell

(10) Patent No.: US 7,543,756 B2
(45) Date of Patent: Jun. 9, 2009

(54) PROVIDING CHANGE INFORMATION FOR DOCUMENTS

(75) Inventor: James Thomas Edward McDonnell, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 326 days.

(21) Appl. No.: 11/361,991

(22) Filed: Feb. 27, 2006

(65) Prior Publication Data

US 2006/0202010 A1 Sep. 14, 2006

(30) Foreign Application Priority Data

Feb. 25, 2005 (GB) ................................ 0503838.5

(51) Int. Cl.
*G06K 19/06* (2006.01)

(52) U.S. Cl. ........................ 235/492; 235/375; 235/382

(58) Field of Classification Search ................. 235/375, 235/492, 380, 382
See application file for complete search history.

(56) References Cited

U.S. PATENT DOCUMENTS

| | | | | |
|---|---|---|---|---|
| 6,769,053 B1 * | 7/2004 | De Jong et al. | ............. | 711/156 |
| 6,827,279 B2 * | 12/2004 | Teraura | ...................... | 235/492 |
| 7,048,194 B2 * | 5/2006 | Minami et al. | .............. | 235/492 |
| 2002/0002567 A1 | 1/2002 | Kanie et al. | | |
| 2004/0233040 A1 | 11/2004 | Lane et al. | | |

FOREIGN PATENT DOCUMENTS

| | | |
|---|---|---|
| EP | 1 393 927 | 3/2004 |

* cited by examiner

*Primary Examiner*—Seung H Lee

(57) ABSTRACT

A method of supplying information comprises providing a document having a memory tag. The document has a human-readable part presenting the information in human-readable form. The method further comprises storing change information identifying changes to the information on the memory tag.

9 Claims, 4 Drawing Sheets

PROVIDING CHANGE INFORMATION FOR DOCUMENTS

This application claims priority from Great Britain patent application GB 0503838.5, filed on Feb. 25, 2005, the entire contents of which is incorporated herein by reference.

FIELD OF THE INVENTION

The invention relates to a method of supplying information, a document comprising a memory tag and a human readable part and an apparatus for providing a document.

BACKGROUND OF THE INVENTION

A memory tag may generally be considered an electronic memory device without an integral power source which needs to be powered to be read or written to. Most conveniently, these may be provided as transponder devices (for example, devices which are inductively powered by radio frequency signals). Memory tags in the form of Radio Frequency Identification (RFID) tags are well known in the prior art. RFID tags come in many forms but all comprise an integrated circuit on which in use data can be stored and a coil which enables it to be interrogated by a reader which also powers it by means of an inductive (wireless) link. Generally RFID tags are quite large, due to the frequency they operate at (13.56 MHz) and the size of coil they thus require, and operate over large ranges and have very small storage capacities. Smaller RFID tags have also been developed, operating at various frequencies, but still having small storage capacities. Some RFID tags include Read Only Memory (ROM) and are written to at the time of manufacture, whilst others have read and write capability. RFID tags have tended to be used in quite simple applications, such as for file tracking within offices or in place of or in addition to bar codes for produce identification and supply chain management.

One use to which such RFID tags can be put is the annotation of items, such as documents, with data over and above that printed on them. For example in EP 1 076 316 A2 Eastman Kodak Company describe the use of an RFID tag of conventional form secured to a print, being an output image on a substrate, possibly of a photograph. The kind of data which it is envisaged will be stored in the RFID tag on the print relates to the manner in which the print has been processed, particularly if the print is an output sheet from a proofing system. In any event the examinations of data given range from 8 buts to 256 bits. A technique is described for communicating with multiple prints within range of the transceiver used to communicate with them, such as for example if a single print needs to be located amongst a file of such prints.

The present invention seeks to provide an improved method for annotation of items, such as documents, and apparatus for doing so.

SUMMARY OF THE INVENTION

According to a first aspect of the invention, there is provided a method of supplying information comprising; providing a document having a memory tag, the document having a human-readable part presenting the information in human-readable form, and storing change information identifying changes to the information on the memory tag.

BRIEF DESCRIPTION OF THE DRAWINGS

An embodiment of the invention will now be described by way of example only with reference to the accompanying drawings wherein.

DETAILED DESCRIPTION OF THE PREFERRED EMBODIMENTS

Figure 1:
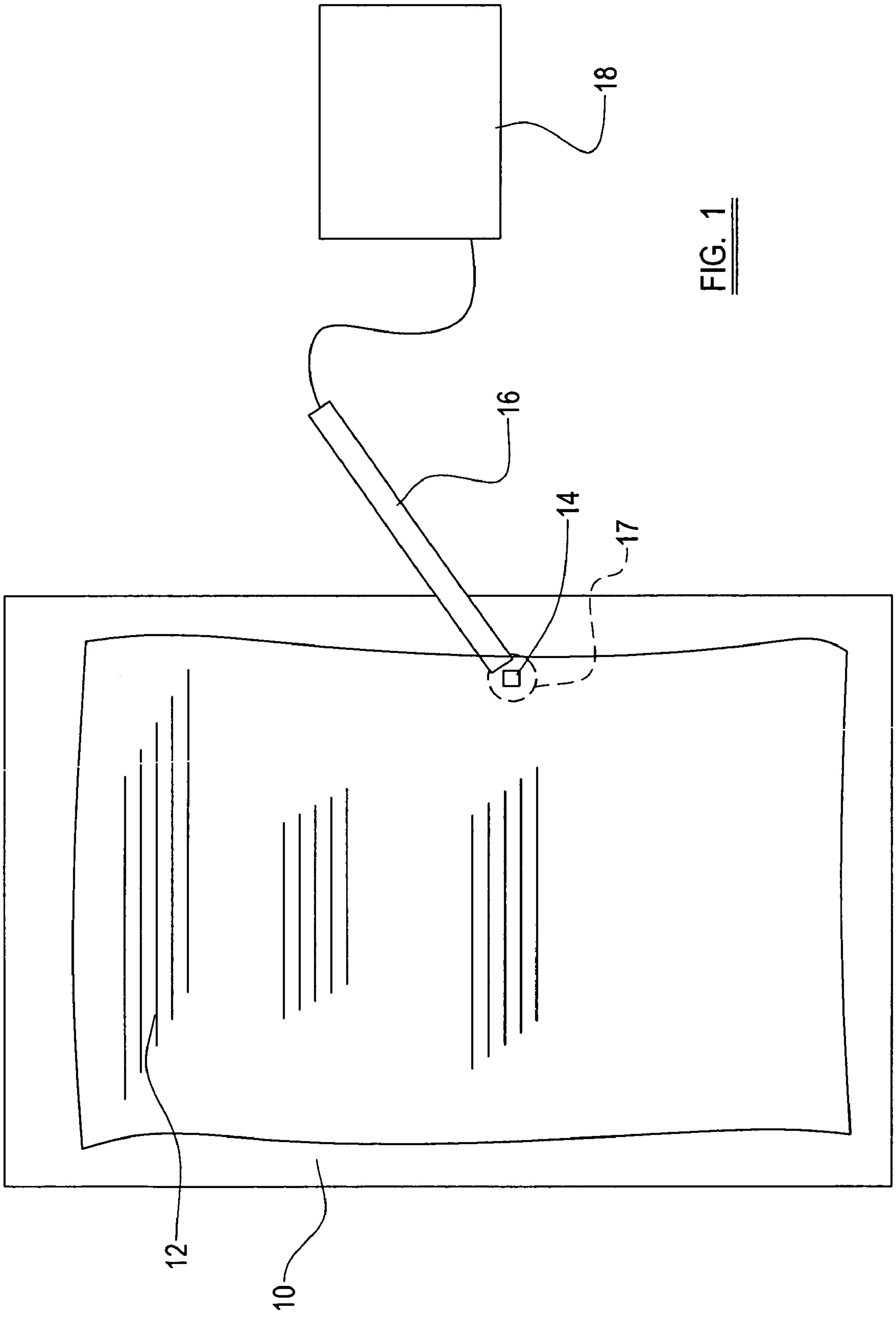
FIG. 1 shows a document in accordance with an embodiment of the present invention and a reader.

FIG. 1 illustrates a document 10, in this case a sheet of paper bearing human-readable part 12, and a memory tag 14. The memory tag 14 has been secured to the sheet of paper at an appropriate location on its surface, or alternatively be embedded in the paper sheet 10, preferably in a location identified a human readable part 12, in order to assist in location it for the purposes of reading data appropriate indications from or writing data to the memory tag 14.

A hand held read/write device 16 may be used to communicate with the memory tags 14 in wireless manner, as will be discussed further below. The read/write device 16 may also be connected to a host computer, display, data rendering device or other apparatus 18 to which the data read from the memory tag 14 is passed.

A specific type of memory tag suitable for use in embodiments of the invention will now be described. A conventional RFID tag has limited memory and is generally suitable for holding a single data item, typically a reference to content held elsewhere or to a database entry. For embodiments of the invention, memory tags which can contain significant digital content are desirable—such a memory tag is described below.

Figure 2:
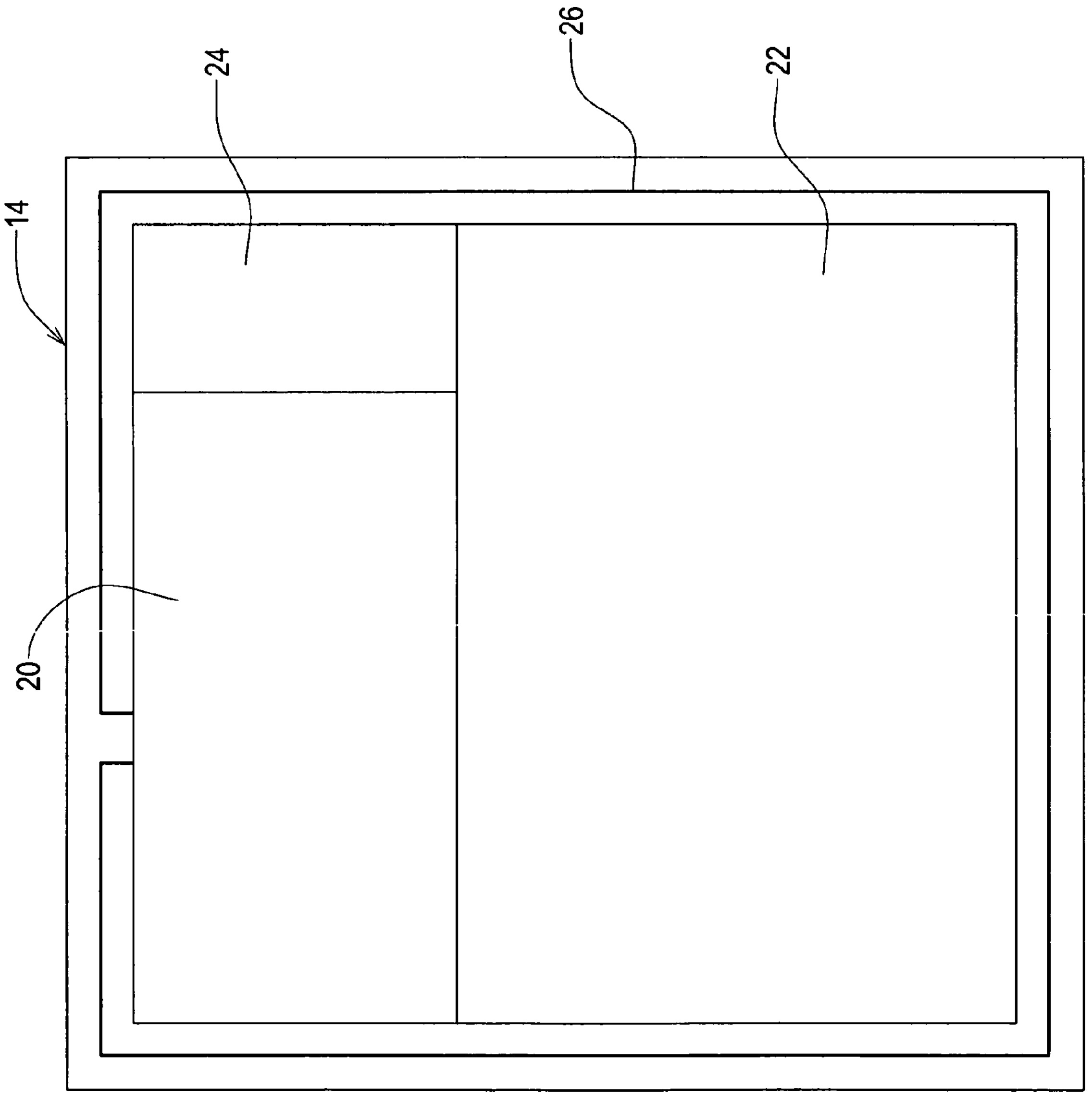
FIG. 2 shows a memory tag suitable for use in an embodiment of the invention.

Referring now to FIG. 2, a schematic of a memory tag 14 is shown. The memory tag 14 is a memory tag provided on a chip, and comprises a transponder circuit 20, a memory 22, a power supply capacitor 24 and an antenna coil 26 having only a few turns e.g. five, or as in this case a single turn. The RFID transponder circuit 20 operates at 2.45 GHz, is of an area of approximately 0.5 $mm^2$, and will be described further below. The memory 22 provides 1 Mbit of capacity of non-volatile memory and is of an area of approximately 1 $mm^2$, and uses FRAM (ferroelectric random access memory) or MRAM (magneoresistive random access memory) or similar memory technology requiring low power. In this example, the memory tags 14 is of a substantially square shape in plan view with an external dimension D for its sides of around 1 mm, although the memory tag may be of other dimensions or shape (e.g. rectangular) as desired.

Figure 3:
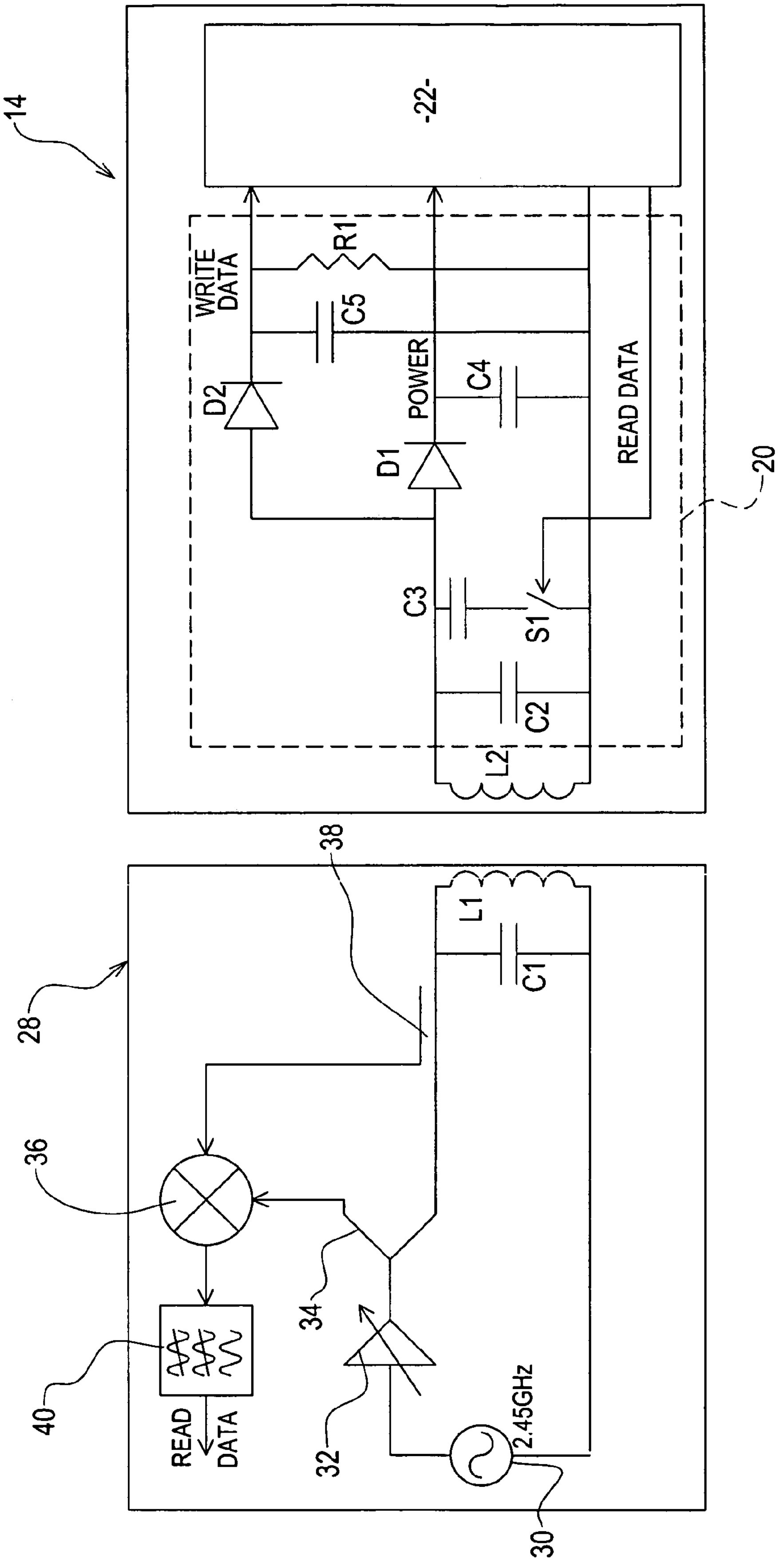
FIG. 3 is an example of the circuitry of a memory tag of FIG. 2 and a read write device for communication with the memory tag.

Referring now to FIG. 3, the circuitry of a memory tag 14 and circuitry 28 of the read/write device 16 are illustrated schematically, using conventional component identifications (C-capacitor, L-inductance, R-resistor, D-diode and S-switch). The transponder circuit 20 of the memory tag 14 comprises a capacitor C2 which, in combination with the antenna coil L2(26), forms a resonant circuit with component values being chosen to tune the combination to approximately 2.45 GHz for inductive coupling with the read/write device 16. The portion of transponder circuit 20 responsible for power supply is diode D1 and capacitor C4(24), with diode D1 rectifying the alternating current generated by the inductive coupling and the capacitor C4 acts as a power supply storage. The portion of the transponder circuit 20 responsible for receiving transmitted data from the read-write device 16 is diode D2, capacitor C5 and resistor R1 which form a simple envelope detector; the data thus received is stored in memory 22. The portion of the transponder circuit 20 responsible for the reading of data from the memory 22 is the tuned circuit L2/C2 in combination with S1 and C3, switching C3 in and out of the circuit using S1 changes the resonance of tuned circuit L2/C2 resulting in phase modulation of the reflected power from the memory tag 14 to the read/write device 16.

The circuit 8 of the read/write device 16 comprises a signal generator 30 which generates a signal at the chosen frequency of 2.45 GHz. This signal passes via an amplitude modulator 32, where it is amplitude modulated with data to be written to the memory tag 14, and a splitter 34, to an antenna L1 and capacitor C1 which form a tuned circuit. The component values of L1 and C1 being chosen to tune it to 2.45 GHz, as for the tuned circuit in the memory tag 14, in order to maximise inductive coupling between the two circuits, and thus transmission of power and data to the memory tag 14.

The splitter 34 takes a part (as much as 50% of the power) of the amplitude modulated signal, for use as a reference signal, and passes it to a multiplier 36. The signal received from the memory tag 14, via the tuned circuit L1/C1 and divided from the outgoing signal by a coupler 38, is also passed to the multiplier 36. Thus the transmitted amplitude modulated signal and received signal are multiplied and then pass through a low pass filter 40 to provide a signal comprising the phase modulation from the memory tag 14 and thus indicative of the data read from the memory tag 14. This signal has then passed to the host computer or other device 18 to which the read/write device 16 is connected, for subsequent data processing.

In the present example, the document 10 is used to present information in the human-readable part 12, for example, as printed text, graphics or otherwise. Change information corresponding to changes between the version of the information shown in the human-readable part 12 and a previous version are stored in the memory tag 14, along with ancillary information as required. Thus, when someone reads the document 10, not only can they read the human-readable part 12 but, by accessing the change information stored on the memory tag 14, can check how the information has been updated, changed, or adapted and compare this with the information presented on the human-readable part 12.

Figure 4:
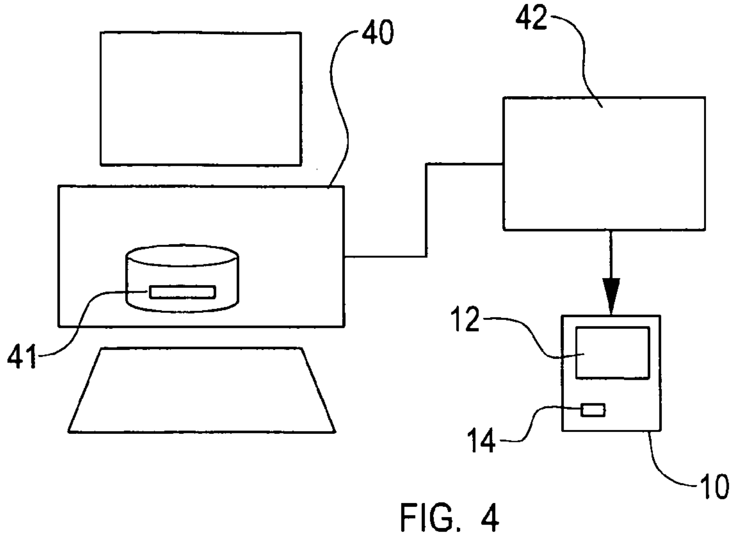
FIG. 4 shows a personal computer operable to perform a method in accordance with the present invention.
Figure 5:
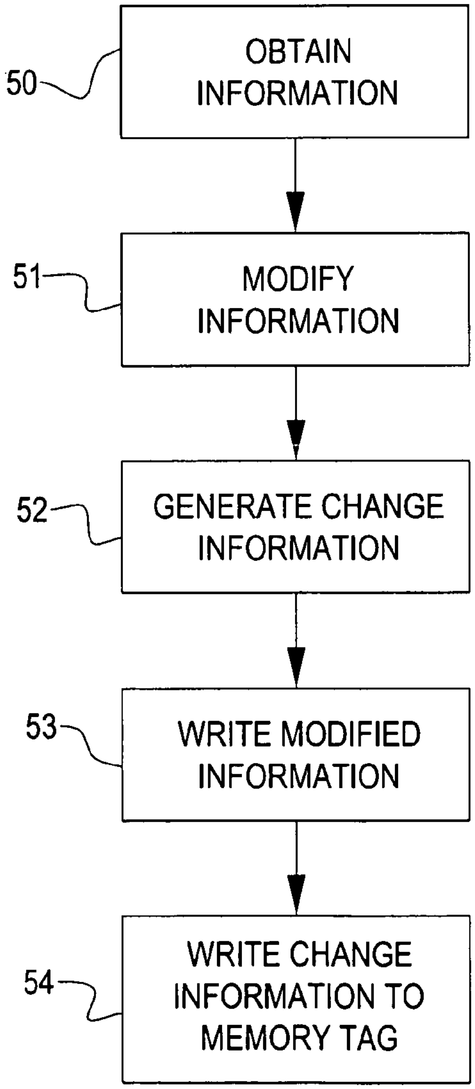
FIG. 5 is a flow chart illustrative of a method embodying the present invention.

To provide a document according to an embodiment of the present invention, it will be appropriate to use an apparatus such as a personal computer as illustrated at 40 in FIG. 4 to perform a method as shown in FIG. 5. The personal computer may store the information 41 in an appropriate format, for example as a text file or other data file and such a way that it can be changed or modified by a user. When it is desired to modify the information the computer 40 is operable to retrieve information 41 at step 50 of FIG. 5. At step 51, the information is modified, for example using a word processor, and at step 52 the computer 40 is operable to compare the modified version of the information with the previous version and generate change information. The change information may be generated by comprising the versions and the information in known manner. At steps 53 and 54, a document 10 is then appropriately created. For example, where the document consists of a printed page with a memory tag added, the computer 40 may send the relevant information to a combined printer and tag writer here shown at 42 where the information is printed on the human readable part 12 and the change information is written to the memory tag. The change information may be locked to prevent subsequent alteration or tampering. In one example, the change information is stored in journalling memory, in which new change information can be stored in the memory but previous change information already stored in the memory cannot be altered.

The change information stored in the memory tag 14 may be provided in any appropriate manner as desired. For example, the change information may comprise a current version of the information presented in the human-readable part 12, together with information identifying the changes made from previous draft or drafts, such that it would be possible to reconstruct the earlier draft from the stored information. Alternatively, the change information could comprise a first or otherwise previous draft of the information presented in the human-readable part 12, and the change information could identify the changes made to that previous draft in order to arrive at the modified version of the information presented in the human-readable part 12. Again, the stored information would make it possible to reconstruct the modified version of the information presented on the human-readable part 12 to check how the modified version was arrived at and its consistency with the stored information. Further alternatively, depending on the quantity of information to be stored and the capacity of the memory 22, it might even be possible, and in some cases simpler, to store a complete copy of the current version and each previous version in the memory 22.

Where the document comprises a plurality of pages, it is envisaged that the memory spot 14 could be embedded in a cover page, or in a spine of the document rather than in a single page, and updated as pages are changed or replaced. Any reader would be able to use the read/write device 16, or any other devices required, to check the contents of the memory tag 14.

This may have uses in any application as desired. For example, in the case of a legal document, the document may comprise a human-readable part which shows the final agreed text of the document, whilst the memory tag 14 shows the changes between the agreement and previous draft. The further, ancillary, information may include such information as the date when a change was made, an identifier indicating who made the change and an identifier indicating who authorised the change. The identifier may be the person's name, initials or other indication. This information may provide both background information as to the reasons for each change, for example, the terms set out in the agreement and subsequently assist in resolving any dispute as well as providing a security check to verify that the information presented on the human-readable part 12 is correct and was agreed.

It will be apparent that such change may be useful in any other document where it is desired to see what changes were made, where and by whom. The ancillary information may also include supplementary information, such as original data for a scientific report, pointers to a related website for any other information as required.

Such a memory spot is sufficiently small to be embedded in a sheet of paper, whilst providing sufficient memory storage to allow adequate change information to be stored and made available.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of supplying information comprising:

providing a document having a memory tag, the document having a human-readable part presenting the information in human-readable form, and storing change information identifying changes to the information on the memory tag, wherein a previous version of the information is stored on the memory tag, wherein a modified version of the information is presented on the human-readable part, and wherein change information corresponding to the differences between the previous version and the modified version is stored on the memory tag, wherein the memory tag is an electronic memory tag.

2. A method according to claim 1 wherein the change information comprises further information relating to the change.

3. A method according to claim 2 wherein the further information relating to the change comprises one or more of:

the date when a change was made, an identifier indicating who made a change, or an identifier indicating who authorized a change.

4. A method according to claim 1, further comprising the step of locking the change information to prevent alteration of the change information.

5. A method of supplying information comprising:

providing a document having a memory tag, the document having a human-readable part presenting the information in human-readable form, and storing change information identifying changes to the information on the memory tag, wherein the information which is presented on the human readable part comprises a modified version of the information, wherein the modified version of the information is stored on the memory tag, and wherein change information corresponding to differences between the modified version and a previous version of the information is stored on the memory tag, wherein the memory tag is an electronic memory tag.

6. A method of supplying information comprising:

providing a document having a memory tag, the document having a human-readable part presenting the information in human-readable form, storing change information identifying changes to the information on the memory tag, providing the memory tag on a first part of the document and the human-readable part on a second part of the document, modifying the information to provide a modified version, replacing the second part with a new second part presenting the modified version in human readable form, and writing change information to the memory tag, wherein the memory tag is an electronic memory tag.

7. A document comprising a memory tag and a human-readable part presenting information in human-readable form, wherein change information identifying changes to the information is stored on the memory tag.

wherein a previous version of the information is stored on the memory tag, wherein a modified version of the information is presented on the human-readable part, and wherein change information corresponding to the differences between the previous version and the modified version is stored on the memory tag.

8. A document according to claim 7 wherein the information which is presented on the human readable part comprises a modified version of the information, wherein the modified version of the information is stored on the memory tag, and wherein change information corresponding to differences between the modified version and a previous version of the information is stored on the memory tag.

9. An apparatus for providing a document comprising information, the apparatus being configured to;

obtain a previous version of the information, allow modification of the information to provide a modified version of the information, generate change information relating to the changes between the previous version of the information and the modified version of the information, generate a document wherein the modified version of the information is presented in human-readable form, and write the change information to a memory tag of the document.

* * * * *